A. O. HUNSAKER.
MOLD FOR FORMING BURIAL VAULTS.
APPLICATION FILED FEB. 11, 1908.

914,417.

Patented Mar. 9, 1909.
2 SHEETS—SHEET 1.

Fig. 1

Witnesses:
R. L. Hamilton
M. Cox

Inventor,
A. O. Hunsaker,
By F. G. Fischer,
Atty.

A. O. HUNSAKER.
MOLD FOR FORMING BURIAL VAULTS.
APPLICATION FILED FEB. 11, 1908.
914,417.
Patented Mar. 9, 1909.
2 SHEETS—SHEET 2.
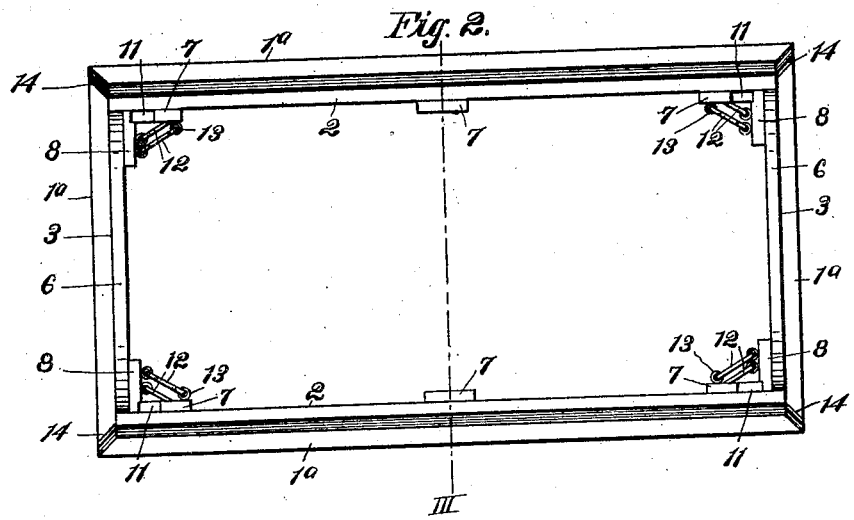
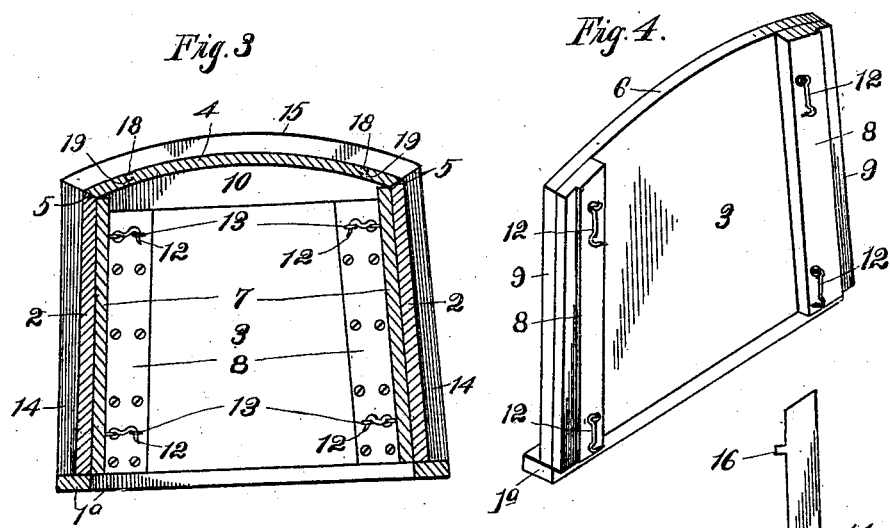
Witnesses:
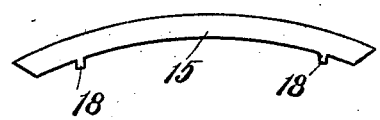
Inventor,
A. O. Hunsaker,
By F. G. Fischer, atty.

UNITED STATES PATENT OFFICE.

ALONZO O. HUNSAKER, OF KANSAS CITY, MISSOURI.

MOLD FOR FORMING BURIAL-VAULTS.

No. 914,417. Specification of Letters Patent. Patented March 9, 1909.

Application filed February 11, 1908. Serial No. 415,272.

*To all whom it may concern:*

Be it known that I, ALONZO O. HUNSAKER, a citizen of the United States, residing at Kansas City, in the county of Jackson and State of Missouri, have invented certain new and useful Improvements in Molds for Forming Burial-Vaults, of which the following is a specification.

My invention relates to improvements in molds for forming burial-vaults made of cement or like material and adapted to be placed over coffins to exclude water therefrom; and one of my objects is to provide a simple mold of this character whereby an inexperienced person may produce burial-vaults expeditiously and of uniform thickness.

Other objects of the invention will hereinafter appear, and in order that it may be fully understood, reference will now be made to the accompanying drawings, in which:

Figure 1 represents a perspective view of my mold with the lid thereof ready to be placed upon the walls of the mold. Fig. 2 is a plan view of the mold with the lid removed. Fig. 3 is a cross-section on line III—III of Fig. 2, with the lid in position upon the walls of the mold. Fig. 4 is a perspective view of one of the end walls of the mold. Figs. 5 and 6 are details of gages for the lid and side walls, respectively.

The mold consists of a pair of side walls 2, a pair of end walls 3, and a lid 4, all of which are separable from each other so they may be easily removed from the burial-vault after the latter has been formed thereon. The lower edges of walls 2 and 3 are reinforced with base-strips 1ª, which project outwardly to form supports for a plurality of gages, hereinafter described. End walls 3 taper toward their upper edges so that when the side walls are placed in position against the same they will lean inward toward their upper edges and permit the mortar, from which the burial-vaults are constructed, to adhere thereto. Lid 4 is curved in cross-section to arch the top of the mold and it snugly fits upon the beveled edges 5 of the side walls and the curved edges 6 of the end walls.

The end and side walls are prevented from springing inward beneath the weight of the mortar by a plurality of reinforcing members 7 and 8, respectively. Members 7 are assisted in preventing the side walls 2 from springing inward by the end walls 3, the sloping edges 9 of which are overlapped by the ends of the side walls, as shown in Figs. 1 and 2. The side walls are further prevented from springing inward by reinforcing members 10 secured to the underside of the lid and adapted to abut at their opposite ends against the side walls, the endmost reinforcing members 7 being cut away at 11 to permit the two endmost members 10 to abut against the side walls. This arrangement also allows the two endmost members 10 to rest upon the endmost members 7 and thus materially assist in supporting the lid.

When the walls are set up, as shown in Figs. 1 and 2, they are reliably secured together by fastening devices at their inner corners consisting of hooks 12 carried by the end walls, and eyes 13 carried by the side walls.

In order that the burial-vault may be of uniform thickness throughout, I provide the outer corners of its walls with gages 14 and its lid with a pair of gages 15. Gages 14 rest upon base-strips 1ª, and are provided with dowel-pins 16 which enter recesses 17 in the ends of walls 2 and thus removably secure the gages in position. Gages 14 extend at an angle of about forty-five degrees from the corners of the mold, so they may regulate the thickness of both the side and end walls of the burial vault. Gages 15 are provided with dowel-pins 18 which engage recesses 19 in the top of the lid and thus removably hold the gages in position thereon.

In practice the walls of the mold are set up and secured together by their fastening devices, after which the lid is placed in position upon their upper edges. The gages 14 15 are then placed in position and the mortar is applied to the side walls and the lid. The material is next reduced to uniform thickness throughout by running a straight-edge over the longitudinal edges of the gages 14 and 15. The gages are now removed and the spaces left thereby are filled with mortar. The outer surface of the material is then troweled to the requisite smoothness, and the whole is permitted to stand until the vault is of sufficient hardness to support itself. It is then inverted and the mold is removed therefrom, which operation is readily accomplished by unfastening the walls and taking them out one at a time.

Having thus described my invention, what I claim is:—

1. A mold of the character described consisting of a pair of tapering end walls, members for reinforcing the same, a pair of side walls removably secured to the end walls, reinforcing members for said side walls, a lid adapted to rest upon the end and side walls, reinforcing members secured to the underside of said lid and adapted to abut against the side walls, and gages removably secured to the top of said lid, substantially as described.

2. A mold of the character described consisting of four separable walls, means at their inner corners for securing the same together, and removable gages extending at an angle of about forty-five degrees from the corners of the mold, substantially as described.

In testimony whereof, I affix my signature, in the presence of two witnesses.

ALONZO O. HUNSAKER.

Witnesses:
 F. G. FISCHER,
 M. COX.